United States Patent [19]

Trainor

[11] Patent Number: 4,529,740
[45] Date of Patent: Jul. 16, 1985

[54] FOAMABLE HOT MELT POLYMER COMPOSITIONS

[75] Inventor: Donna R. Trainor, West Roxbury, Mass.

[73] Assignee: W. R. Grace & Co., Cambridge, Mass.

[21] Appl. No.: 652,400

[22] Filed: Sep. 20, 1984

Related U.S. Application Data

[63] Continuation-in-part of Ser. No. 577,118, Feb. 6, 1984.

[51] Int. Cl.$^3$ .............................................. C08J 9/14
[52] U.S. Cl. .................................... 521/84; 521/84.1; 521/139; 521/140; 525/93
[58] Field of Search .................. 525/93; 521/81, 84, 521/139, 140

[56] References Cited

U.S. PATENT DOCUMENTS

| | | | |
|---|---|---|---|
| 3,265,765 | 8/1966 | Holden et al. | 521/139 |
| 3,294,868 | 12/1966 | Pritchard | 521/139 |
| 3,437,718 | 4/1969 | Rees | 521/139 |
| 3,867,319 | 2/1975 | Lundberg | 521/146 |
| 4,102,829 | 7/1978 | Watanabe et al. | 521/81 |
| 4,156,754 | 5/1979 | Cobbs, Jr. et al. | 428/310 |
| 4,171,411 | 10/1979 | Ehrenfreund | 521/139 |
| 4,259,402 | 5/1981 | Cobbs, Jr. et al. | 428/310 |
| 4,274,637 | 6/1981 | Molitor | 521/139 |
| 4,295,573 | 10/1981 | Terry | 427/231 |

FOREIGN PATENT DOCUMENTS 0031673 7/1981 European Pat. Off. .

OTHER PUBLICATIONS

Chem. Abstracts 87:103144a Tominaga, Takashi et al., "Foamable Hot-Melt Adhesives", 1977.
Chem. Abstracts 91:58323c Lauterberg, Werner et al., "Coating of Porous Substrates", 1979.
Chem. Abstracts 97:145942w Henkel (Japan) Ltd., "Foam-Bonded Poly(vinyl chloride) Sheets for Automobile Interiors", 1982.
Chem. Abstracts 75:152590d Ishikawa, Hisao, "Hot Melt Adhesives," 1971.
Chem. Abstracts 78:125499m Ito, Yashizo et al., "Hot Melt Textile Adhesive Compositions", 1973.
Journal: *TAPPI Hot Melt Short Course Notes* 1980–Walter H. Cobbs, Jr., "Foaming of Hot Melts", pp. 103–118.
*Adhesives for Industry*, Doug Crosby, "Foamed Hot Melt Adhesive and Applicating Equipment", Jun. 24–25, 1980, pp. 131–139.
Journal: *Hot Melt Adhesive Coatings*, Doug Crosby, "Foamed Hot Melts A Factor for the Future", 1981, pp. 69–74.
*Adhesives Age*, Walter H. Cobbs, Jr., "Foamability of Hot Melt Adhesives", Dec., 1979, pp. 31–36.
Durst, Ronald L., "Major Backsizing Applications Used in Carpet Finishing", Nov. 1–3, 1978, pp. 220–228, Published by Am. Assoc. of Text. Chem. & Color.

*Primary Examiner*—Morton Foelak
*Attorney, Agent, or Firm*—Stacey L. Channing; William L. Baker

[57] ABSTRACT

Hot melt compositions are disclosed from which foamed products having a fine and uniform void structure therein can be obtained. The compositions include a thermoplastic polymer preferably an elastomer such as a styrene-butadiene block copolymer, and a small amount of a salt of a sulfonated styrene polymer. Plasticizing processing aids, tackifying agents and antioxidants can be included in the compositions, as well as in addition surfactants such as dodecylbenzene sulfonate. The composition can be mixed with gaseous blowing agents by suitable means and dispensed to produce foamed products suited for example as sealants in closures for containers.

17 Claims, 6 Drawing Figures

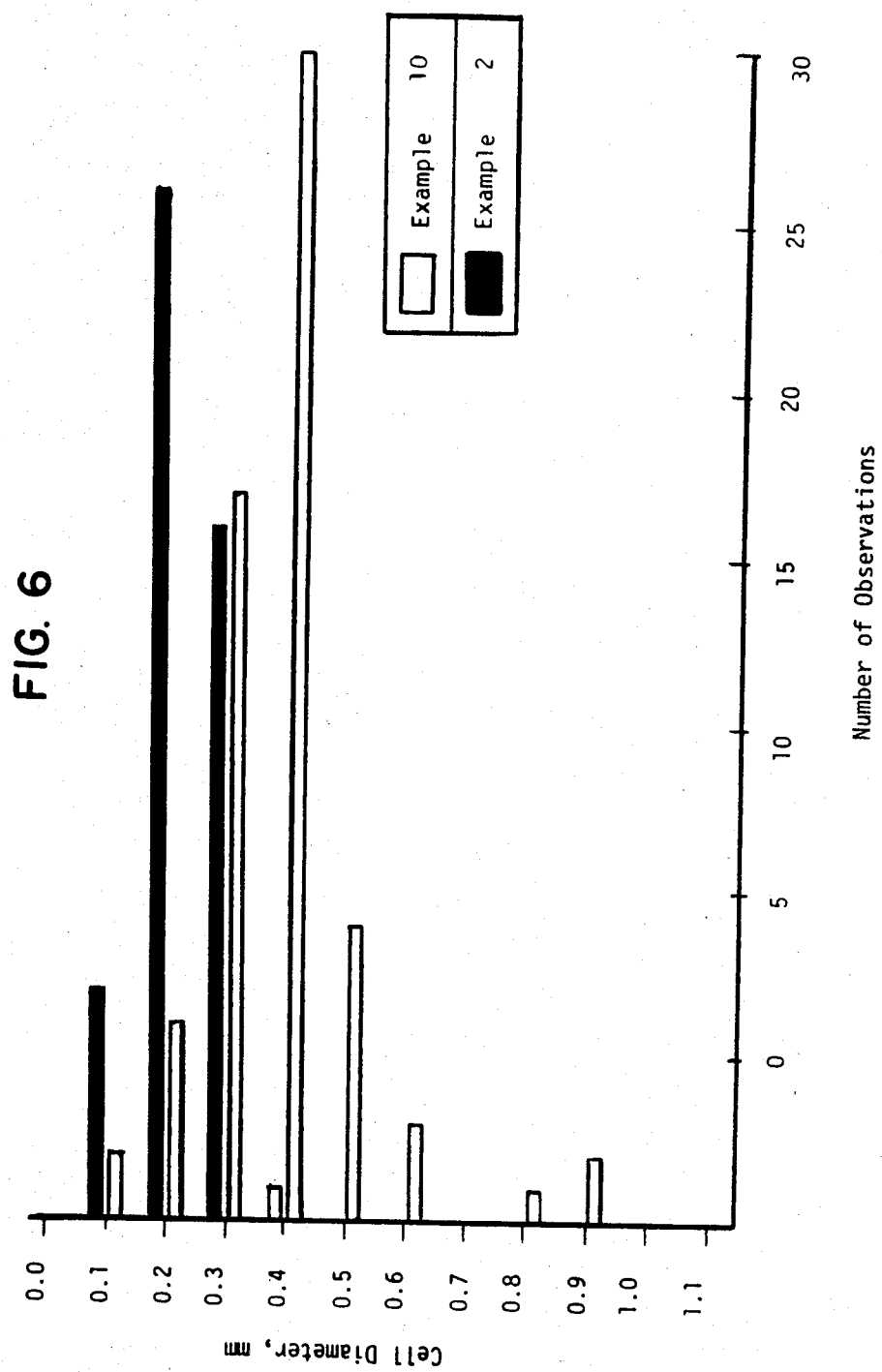

FOAMABLE HOT MELT POLYMER COMPOSITIONS

REFERENCE TO RELATED APPLICATIONS

This application is a continuation-in-part of copending application Ser. No. 577,118 filed on Feb. 6, 1984.

BACKGROUND OF THE INVENTION

This invention relates to hot melt compositions and particularly to foamable elastomeric hot melt compositions useful in the sealing of containers such as bottles, jars, cans, and the like.

Hot melt compositions, that is compositions which become fluid when heated above ambient temperature and return to a non-fluid or less fluid state when cooled, have found wide use as adhesives and sealants in a number of applications. Often it is desirable that the hot melt composition have a certain degree of resiliency after application, and to this end, methods have been devised to impart a cellular structure to the applied composition.

Traditionally, a surfactant (foaming agent) is added to a thermoplastic polymer to reduce the size of the foamed cells (voids) and cause the voids to be of a more uniform size. For example, in U.S. Pat. Nos. 4,156,754 and 4,259,402, to Cobbs et al, surfactants are added to molten thermoplastic material in order to extend the life or stability of the hot melt adhesive foam.

The use of hot melt compositions having a cellular structure as sealants in closures for containers is described, for example, in U.S. Pat. No. 4,295,573 to Terry et al. In the procedure disclosed in this patent, a heated, pressurized mixture of thermoplastic hot melt composition and a gas such as nitrogen is formed and dispensed to the closure at atmospheric pressure while in a cellular or foamed state. Upon cooling, the cellular state of the applied composition is retained, providing a closure having a resilient sealant material applied thereto.

It is a principal object of this invention to provide a hot melt composition from which a soft, elastomeric, foamed structure having very fine, uniformly sized voids is obtained.

SUMMARY OF THE INVENTION

In the present invention, a foamable thermoplastic hot melt composition is provided from which a soft, elastomeric, foamed structure having very fine, uniformly sized voids therein is obtained. Such a cellular structure is important in, for example, the use of the hot melt composition in the sealing of container closures. The smaller and more uniform the voids, the more stable and long lived the foamed hot melt. According to the invention, use is made of salts of sulfonated styrene polymers in foamable hot melt compositions to provide a structure in the applied hot melt composition which is comprised of small and uniform voids.

BRIEF DESCRIPTION OF THE DRAWINGS

FIG. 6 is a graph comparing the void size distribution of the foamed hot melt compositions of Examples 2 and 10.

DESCRIPTION OF THE PREFERRED EMBODIMENT

Figure 1:
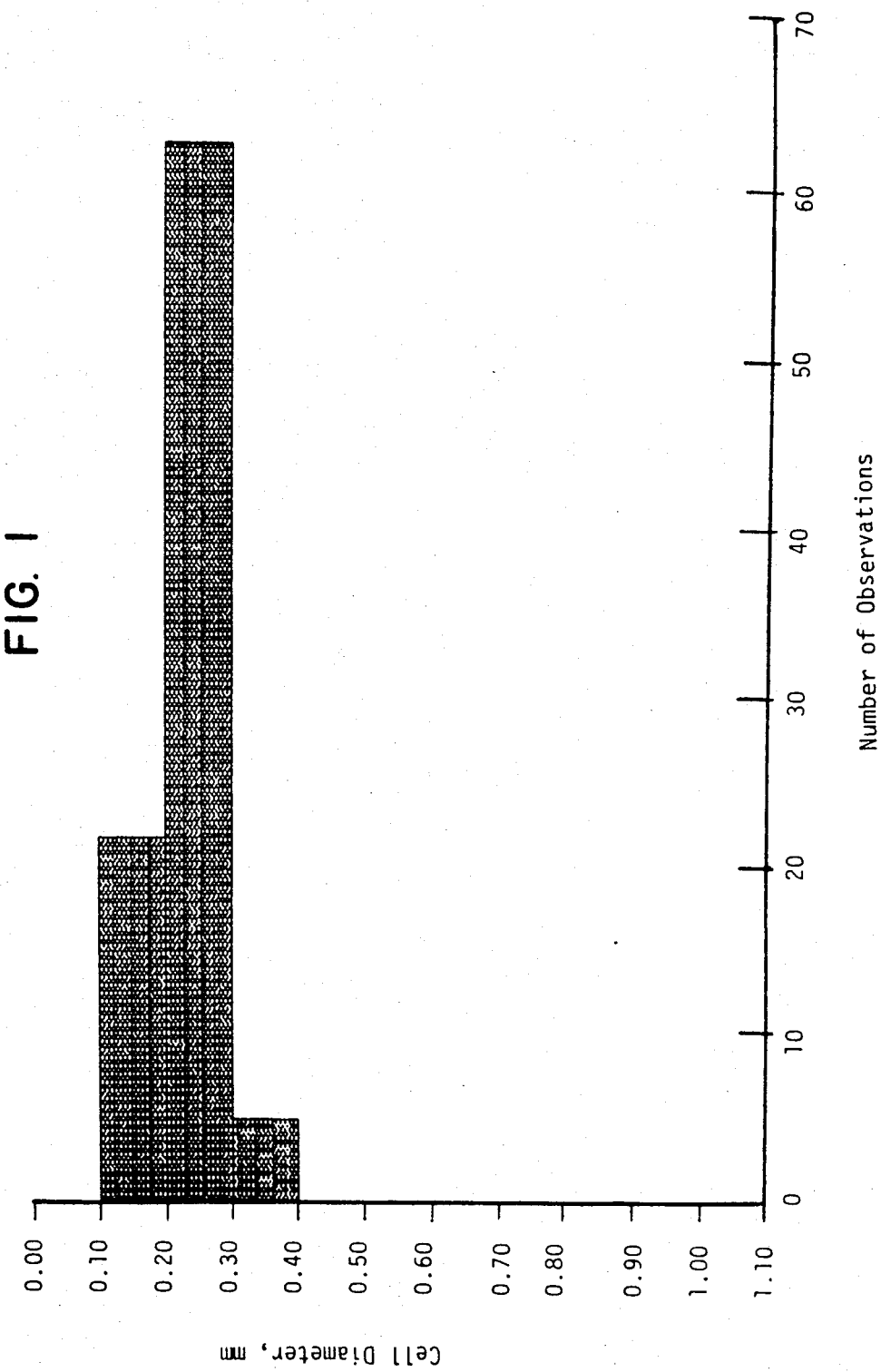
FIG. 1 is a graph showing the void size distribution of the foamed hot melt composition of Example 1.

Hot melt compositions of the invention are formed from which foamed products having a fine and uniform cellular structure therein can be obtained.

The foamable hot melt composition of the invention comprises at least one non-ionomeric synthetic thermoplastic polymer, preferably an elastomer, and a small amount, preferably up to about 10 parts by weight, of at least one salt of a sulfonated styrene polymer. The hot melt composition preferably includes from about 20 to about 70 parts by weight of thermoplastic polymer, from about 25 to about 65 parts by weight of plasticizer, and from about 0 to about 20 parts by weight of a tackifying resin. Optionally, one or more surfactants can be substituted for a portion of the sulfonated styrene polymer salt component. In addition, the hot melt composition of the invention may contain antioxidants, fillers, etc.

Suitable thermoplastic polymers include, among others, a block copolymer of styrene and butadiene; a block copolymer of styrene and ethylene butylene; a block copolymer of styrene and isoprene; a copolymer of ethylene and vinyl acetate; and the polyethylene based thermoplastic polymer component in "Eastobond A-3" adhesive composition, manufactured by Eastman Chemical Company. The preferred thermoplastic polymer is a block copolymer of styrene and butadiene.

Suitable salts of sulfonated styrene polymers include, among others, a salt of a sulfonated copolymer of maleic anhydride and styrene; a salt of a sulfonated copolymer of divinylbenzene and styrene; and a salt of sulfonated polystyrene. The sulfonated styrene polymer salt can be used alone or optionally in combination with a surfactant, as described in the following Examples. While the ionic surfactant, sodium dodecylbenzene sulfonate was used in the Examples, other surfactants can be used in the compositions of the invention.

Mineral oil as well as other hydrocarbon oils can be used as the plasticizing or processing aid in the hot melt composition of the invention. Polymerized dipentene is the preferred tackifying resin used in the hot melt composition of the invention; however, other tackifying resins such as polystyrene resin may be used.

The invention is further illustrated by the following nonlimiting Examples. In the Examples, every time the term parts is used, it means parts by weight.

EXAMPLE 1

To a heated (350° F.) mixer was charged 50 parts styrene-ethylene butylene-styrene block copolymer, 50 parts mineral oil, and 1.5 parts of an antioxidant. The foregoing ingredients were mixed for approximately 45 minutes while raising the temperature of the batch to 340° F. Ten parts of a liquid hydrocarbon tackifying resin (polymerized dipentene) was added, and the materials were mixed until the batch was homogenous (the batch temperature was maintained at 320°–340° F. during mixing). Heating was discontinued and one part each of the following was added gradually (a) sodium salt of dodecylbenzene sulfonate (containing 10% sodium sulfate) and (b) sodium salt of a sulfonated copolymer of styrene and maleic anhydride.

The foamable hot melt composition was then applied to the interior of a polypropylene bottle cap to produce a sealing gasket therein by dispensing the composition in the form of a foam into the cap using the apparatus and method disclosed in the above mentioned patent to Terry et al. Briefly, such apparatus heated (375°–400° F.) and mixed the composition with nitrogen blowing gas under pressure, and dispensed the hot composition to the cap in the form of a foam. Upon cooling, an annular sealing gasket of foamed hot melt was obtained.

The characterization of the void structure of the foamed hot melt of this example, as depicted in FIG. 1, was as follows:

$\overline{D}$ (Average void diameter) = 0.217 mm
s (Standard deviation) = 0.049 mm
cv (coefficient of variation ($s/\overline{D} \times 100$) = 23%
n (number of observations) = 90

The foamed hot melt composition had a volume of voids of approximately 40%.

EXAMPLE 2

The procedure of Example 1 was repeated, except styrene-butadiene-styrene block copolymer was used in place of styrene-ethylene butylene-styrene block copolymer; 40 parts of mineral oil were used; 0.5 parts of an antioxidant were used; and 1 part of a sodium salt of sulfonated polystyrene was used instead of the 1 part of each of (a) the sodium salt of dodecylbenzene sulfonate and (b) the sodium salt of a sulfonated copolymer of styrene and maleic anhydride.

Figure 2:
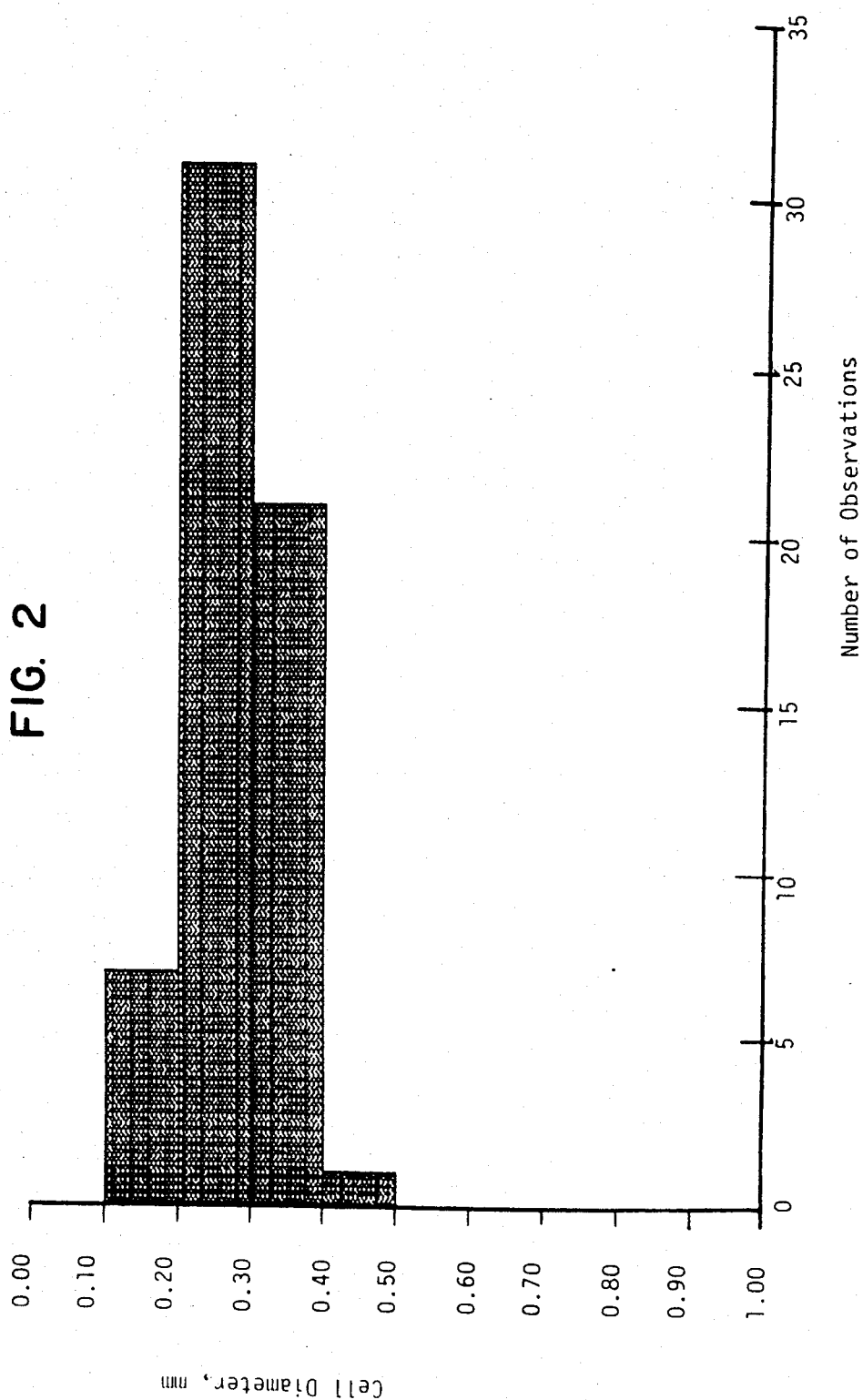
FIG. 2 is a graph showing the void size distribution of the foamed hot melt composition of Example 2.

The characterization of the void structure of the foamed hot melt of this example, as depicted in FIG. 2, was as follows:

$\overline{D}$ = 0.268 mm
s = 0.058 mm
cv = 22%
n = 60

EXAMPLE 3

The procedure of Example 1 was repeated, except 100 parts of "Eastobond A-3", manufactured by Eastman Chemical Company were used in place of the 50 parts of styrene-ethylene butylene-styrene block copolymer; no mineral oil was added; no polymerized dipentene resin was added; and 0.5 parts of an antioxidant were added.

Eastobond A-3 is a conventional polyethylene based adhesive composition. "Eastobond A-3" is not considered an elastomeric composition since it is not rubbery at room temperature, but rather is rubbery above room temperature.

Figure 3:
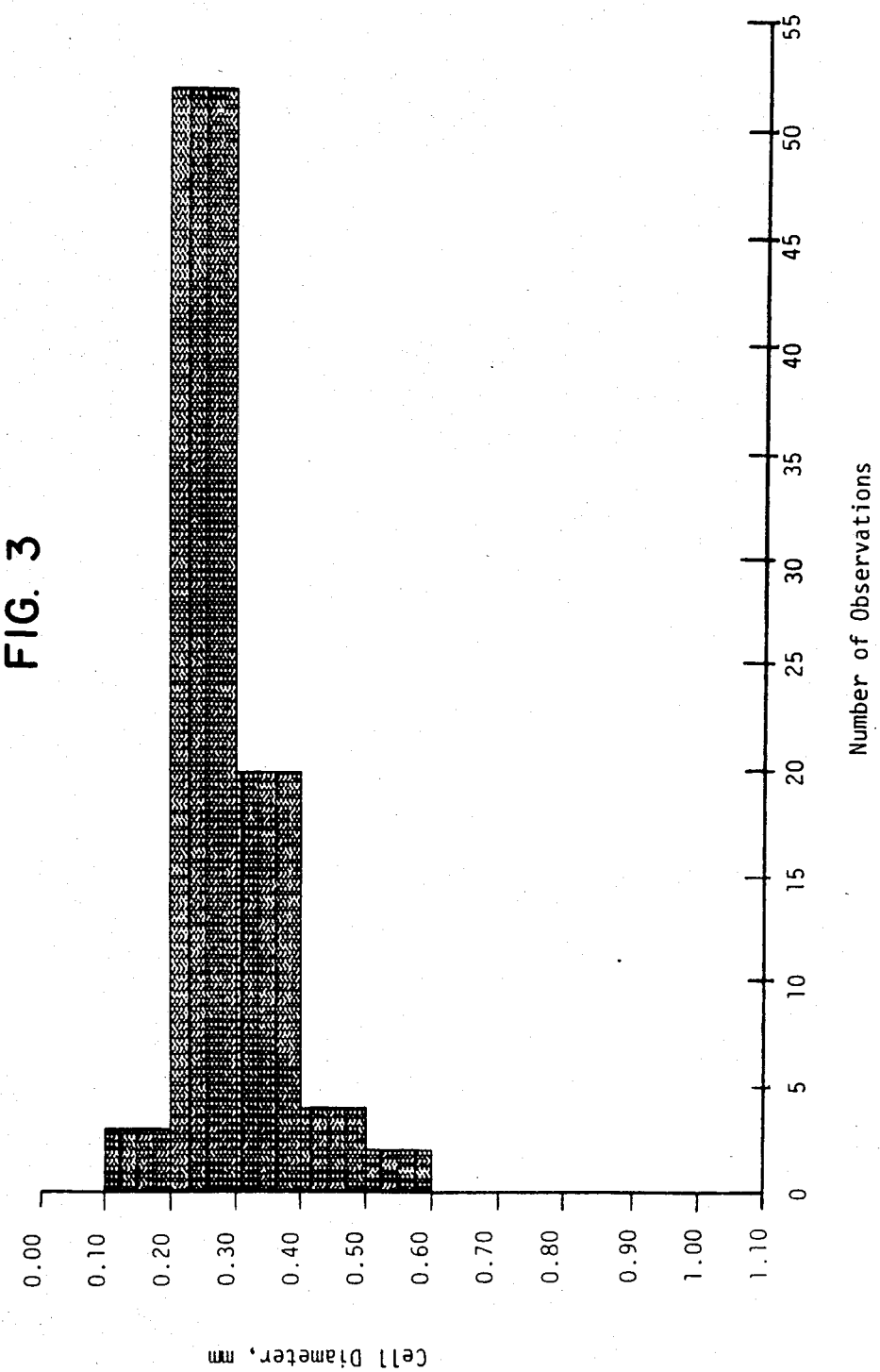
FIG. 3 is a graph showing the void size distribution of the foamed hot melt composition of Example 3.

The characterization of the void structure of the foamed hot melt of this example, as depicted in FIG. 3 was as follows:

$\overline{D}$ = 0.264 mm
s = 0.073 mm
cv = 28%
n = 81

EXAMPLE 4

The procedure of Example 1 was repeated, except 40 parts of styrene-butadiene-styrene block copolymer and 10 parts of styrene-isoprene-styrene block copolymer were used in place of 50 parts of styrene-ethylene butylene-styrene block copolymer; 40 parts of mineral oil were used; and 1 part of a sodium salt of the sulfonated copolymer of divinylbenzene and styrene was used in place of 1 part of the sodium salt of sulfonated copolymer of maleic anhydride and styrene.

Figure 4:
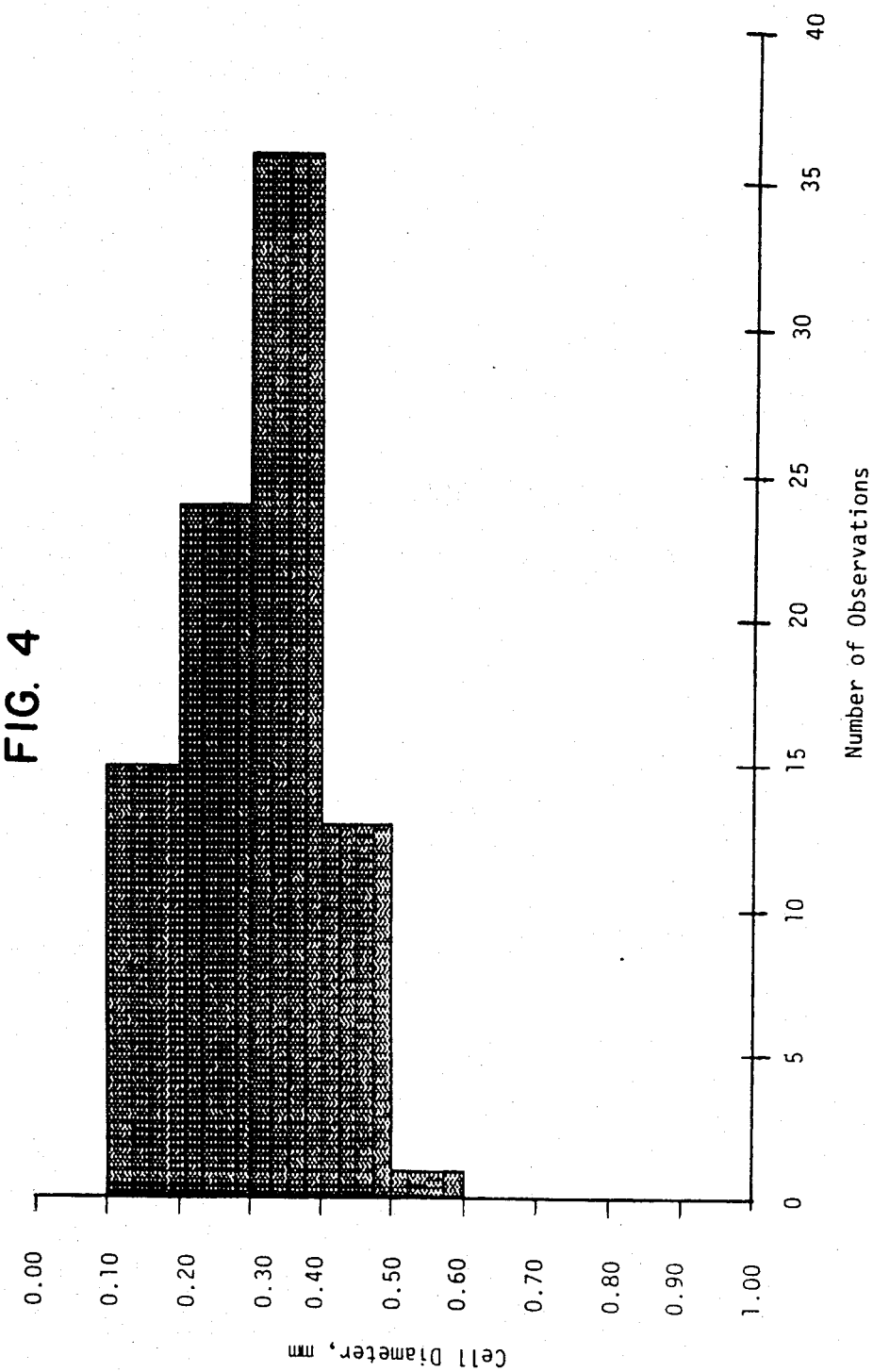
FIG. 4 is a graph showing the void size distribution of the foamed hot melt composition of Example 4.

The characterization of the void structure of the foamed hot melt of this example, as depicted in FIG. 4 was as follows:

$\overline{D}$ = 0.306 mm
s = 0.100 mm
cv = 33%
n = 90

EXAMPLE 5

The procedure of Example 1 was repeated, except styrene-butadiene-styrene block copolymer was used in place of styrene-ethylene butylene-styrene copolymer; 40 parts of mineral oil were used; and polystyrene resin was used in place of polymerized dipentene resin.

EXAMPLES 6–10—PRIOR ART

The procedure of Example 2 was repeated, except the one part of the sodium salt of sulfonated polystyrene was not added, but was rather replaced (a) in Example 6 by nothing; (b) in Example 7 by 1 part of titanium dioxide; (c) in Example 8 by 1 part of sodium dioctyl sulfosuccinate; (d) in Example 9 by 1 part of sodium dodecyl sulfate and 1 part of block copolymer of ethylene oxide and propylene oxide; and (e) in Example 10 by 1 part of zinc salt of ethylene methacrylic acid copolymer.

The characterizations of the void structures of the foamed hot melts of Examples 6–10 were as follows:

|  | Ex. 6 | Ex. 7 | Ex. 8 | Ex. 9 | Ex. 10 |
| --- | --- | --- | --- | --- | --- |
| $\overline{D}$ (mm) | .625 | .557 | .633 | .468 | .435 |
| s (mm) | .174 | .230 | .217 | .156 | .144 |
| cv (%) | 28 | 41 | 34 | 33 | 33 |
| n | 60 | 46 | 50 | 102 | 80 |

Examples 7–10 depict the prior art practice, as disclosed in U.S. Pat. Nos. 4,156,754 and 4,259,402, of adding surfactants to a thermoplastic polymer. Previously in the prior art, no surfactant was added to the thermoplastic polymer, as depicted in Example 6.

Figure 5:
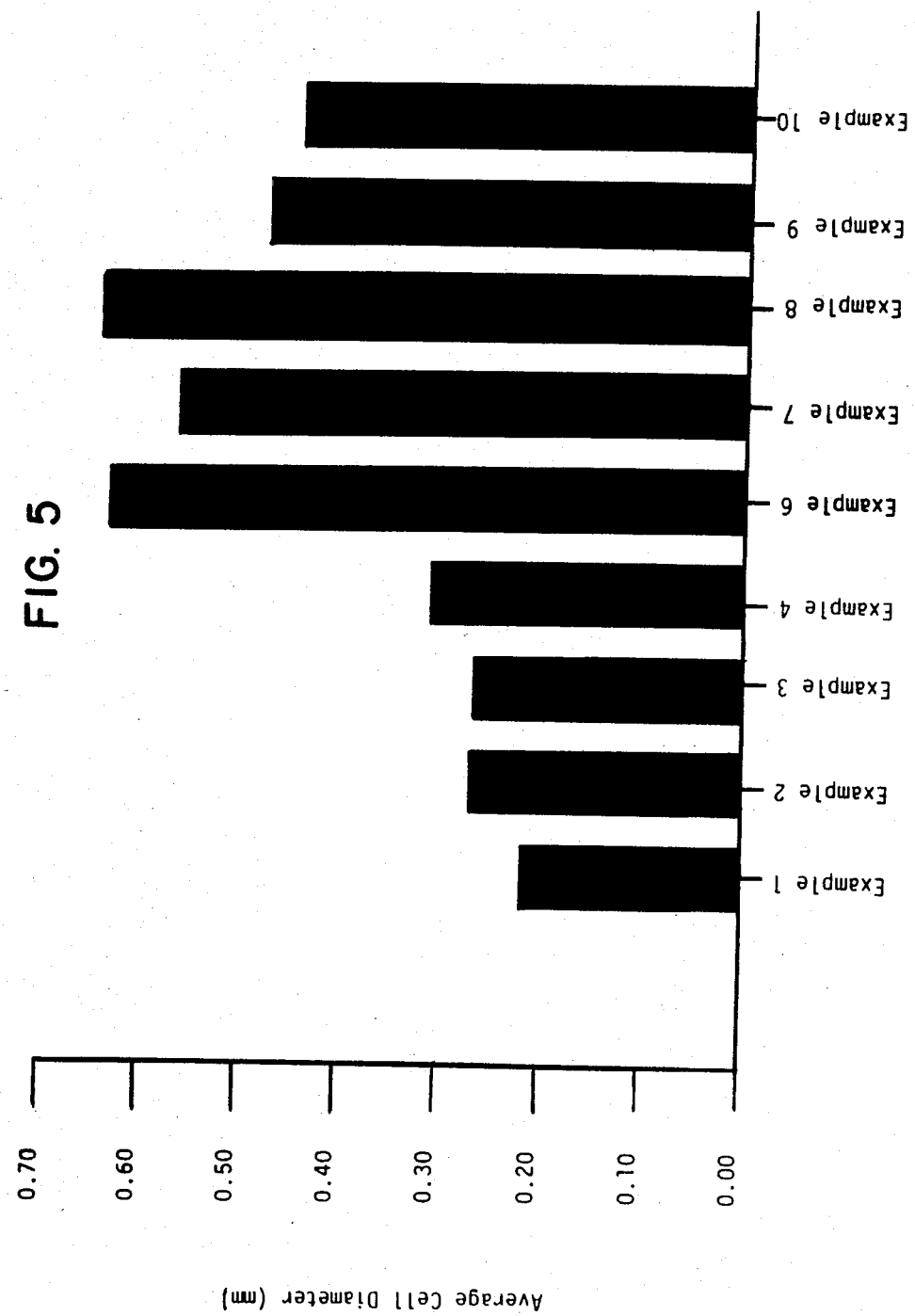
FIG. 5 is a graph comparing the average void diameters of the foamed hot melt compositions of Examples 1–4 and 6–10.

As seen graphically in FIGS. 5 and 6, if a salt of a sulfonated styrene polymer is used alone with a thermoplastic polymer or optionally in combination with a traditional surfactant, the result is a foamed hot melt having a smaller and more uniform void structure.

The foamable hot melt composition of the invention may be dispensed by any of the known methods in the art, but is most conveniently dispensed as in the Examples, i.e. using the method and apparatus described in U.S. Pat. No. 4,295,573. The apparatus disclosed in such patent mixes the foamable hot melt composition with a gaseous blowing agent such as nitrogen, carbon dioxide or air while the composition is in a fluid or molten state. Pressure above atmospheric is applied to the hot fluid mixture and upon dispensing of the hot mixture at atmospheric pressure, the gaseous blowing agent expands causing voids to be formed in the applied composition. The use of the salt of sulfonated styrene polymer optionally in combination with a surfactant has been found to produce a structure comprised of small and uniform voids. Such a void structure is important for example in use of the foamed hot melt as a sealing gasket in container closures, where consistent, uniform sealing between all areas of the gasket and the sealed container, for example glass bottle, is desired.

The foamable compositions of the invention are particularly suited for use as sealants in closures for containers, but it will be obvious to one skilled in the art that such compositions can be used in other applications, for example as adhesives and/or sealants in applications outside of the container closure field.

It is claimed:

1. A foamable composition comprising:
   a hot melt composition comprising:
   at least one non-ionomeric synthetic thermoplastic polymer and a small amount of at least one salt of a sulfonated styrene polymer; and
   a blowing agent.

2. The composition of claim 1 wherein said thermoplastic polymer is an elastomeric polymer.

3. The composition of claim 2 wherein said elastomeric polymer is a block copolymer of styrene and butadiene.

4. The composition of claim 1 additionally containing a plasticizing agent and a tackifying agent.

5. The composition of claim 4 wherein said plasticizing agent is mineral oil and said tackifying agent is polymerized dipentene resin.

6. The composition of claim 1 additionally containing a surfactant.

7. The composition of claim 6 wherein said surfactant is sodium dodecylbenzene sulfonate.

8. The composition of claim 1 additionally containing an antioxidant.

9. The composition of claim 1 wherein said sulfonated styrene polymer is sulfonated polystyrene or a sulfonated copolymer of styrene and maleic anhydride or divinylbenzene.

10. The composition of claim 1 wherein up to about 10 parts by weight of at least one salt of sulfonated styrene polymer is present.

11. A method of producing a foamed composition comprising the steps of:
    (a) mixing a hot melt composition comprising at least one non-ionomeric synthetic thermoplastic polymer and a small amount of at least one salt of a sulfonated styrene polymer with a gaseous blowing agent while said composition is in a heated fluid state; and
    (b) dispensing the resulting mixture to provide a foamed composition having voids therein.

12. The method of claim 11 wherein in step a, the hot melt composition is mixed with the gaseous blowing agent under pressure and thereafter in step b, the resulting mixture is dispensed at atmospheric pressure.

13. The method of claim 11 wherein in step b, said resulting mixture is dispensed to a container closure to provide a sealing element therein.

14. A container closure comprising as a sealing gasketing means a foamed composition comprising at least one non-ionomeric synthetic thermoplastic polymer and a small amount of at least one salt of a sulfonated styrene polymer.

15. The composition of claim 1 wherein said thermoplastic polymer is selected from the group consisting of a block copolymer of styrene and ethylene butylene, a block copolymer of styrene and isoprene, a copolymer of ethylene and vinyl acetate, and polyethylene.

16. The method of claim 11 wherein in step a, the thermoplastic polymer is selected from the group consisting of a block copolymer of styrene and butadiene, a block copolymer of styrene and ethylene butylene, a block copolymer of styrene and isoprene, a copolymer of ethylene and vinyl acetate, and polyethylene.

17. The container closure of claim 14 wherein the thermoplastic polymer is selected from the group consisting of a block copolymer of styrene and butadiene, a block copolymer of styrene and ethylene butylene, a block copolymer of styrene and isoprene, a copolymer of ethylene and vinyl acetate, and polyethylene.

* * * * *